(No Model.)

J. J. HEILMANN.
ELECTROLOCOMOTIVE.

No. 550,344.

2 Sheets—Sheet 1.

Patented Nov. 26, 1895.

WITNESSES.

INVENTOR (No Model.) 2 Sheets—Sheet 2.
J. J. HEILMANN.
ELECTROLOCOMOTIVE.

No. 550,344. Patented Nov. 26, 1895.

UNITED STATES PATENT OFFICE.

JEAN JACQUES HEILMANN, OF PARIS, FRANCE.

ELECTROLOCOMOTIVE.

SPECIFICATION forming part of Letters Patent No. 550,344, dated November 26, 1895.

Application filed February 13, 1895. Serial No. 538,188. (No model.)

*To all whom it may concern:*

Be it known that I, JEAN JACQUES HEILMANN, engineer, a citizen of the French Republic, residing at 19 Rue Cambon, Paris, in the Department of Seine and Republic of France, have invented certain new and useful Improvements in and Connected with Electrolocomotives; and I do hereby declare the following to be a full, clear, and exact description of the invention, such as will enable others skilled in the art to which it appertains to make and use the same, reference being had to the accompanying drawings, and to letters of reference marked theron, which form a part of this specification.

This invention relates to that system of electrolocomotion on railways and tramways in which the electromotors directly drive the axles of the vehicles. Its object is to prevent the shocks and vibrations to which the axles may be subjected being transmitted to the motors and at the same time to provide for an elastic connection between the armature of the motor and the axle which it drives.

The accompanying drawings illustrate in what manner this invention may be carried into practical effect and will be hereinafter referred to.

Figure 1:
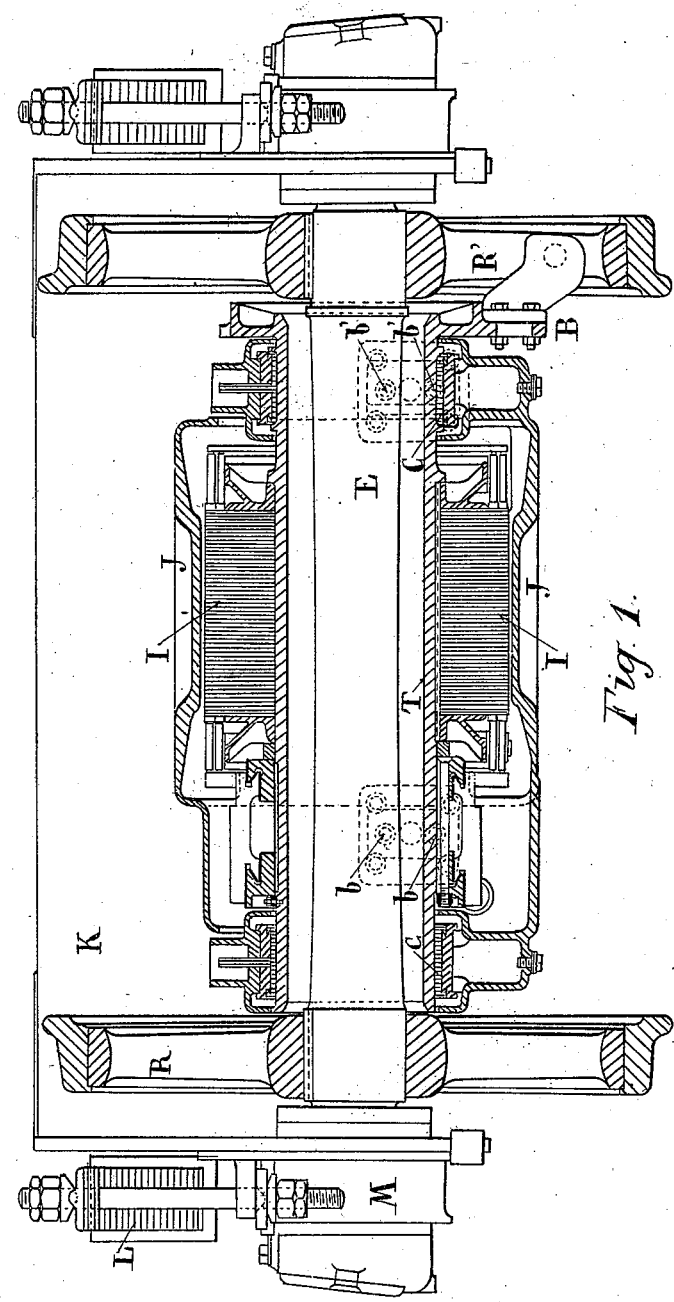
Figure 2:
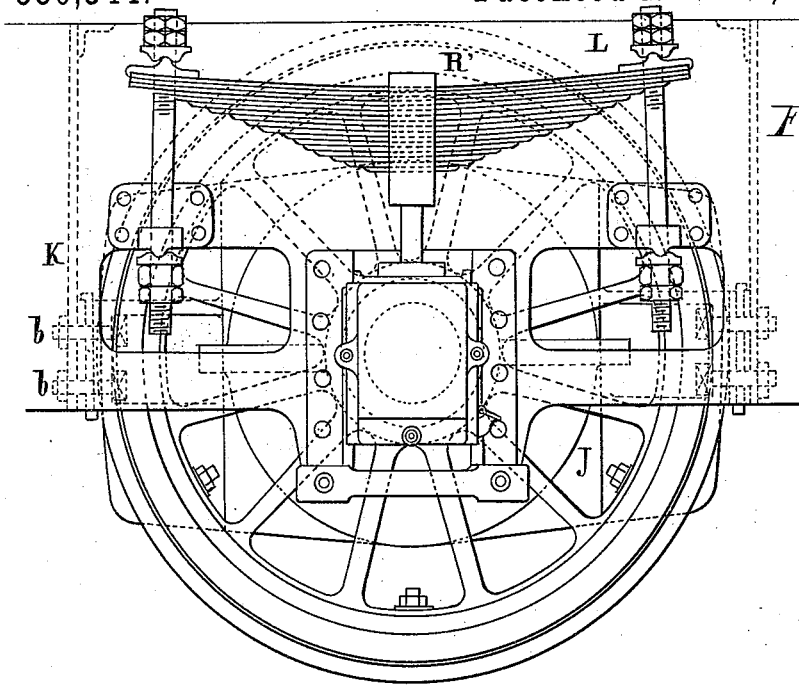

Figure 1 is a transverse section; Fig. 2, an end elevation, and Fig. 3 a sectional elevation.

The motor-armature I is mounted upon a hollow shaft T, which has an internal diameter greater than that of the axle E, upon which it is free. This hollow shaft rotates in the bearings C C', fixed in or upon the field-magnets J, which are themselves fixed to the framing K of the vehicle. This framing K is suspended in the ordinary manner by means of the springs L or by any suitable combination of springs, levers, and the like commonly used. In the drawings a half-elliptic spring is shown, the central spring-band being rigidly supported on the axle-box, while the frame K is suspended from the ends of the spring by hangers, which are adjustable in length. It follows that the entire motor is suspended like the framing K and practically forms one part with it, and that it suffices to give the tube T, upon which the armature is mounted, an internal diameter equal to the diameter of the axle plus the amount of yielding of the springs L, in order to prevent any possibility of contact between the tube and the axle.

A certain number of arms B are fixed upon the hollow shaft T and serve to communicate motion from the armature to the axle through the wheels. These arms may have the shape indicated by Figs. 2 and 3—that is to say, their extremities enter between two buffers *t*. Each of these buffers is formed of a rod *t*, which traverses two spokes D and which compresses a spring *r*, mounted between the two spokes.

The rod may be connected with the spring in any convenient manner—as, for instance, by means of a collar on the rod abutting against the adjacent end of the encircling helical spring. The other end of said spring is seated in a socket in one of the spokes.

Bushings S may be inserted in the holes through which the rod *t* passes to permit renewal when worn.

The flexibility of the spring *r* is sufficient to permit its yielding under the effort of starting and of its movement under the influence of vibrations—that is to say, it is equal to the set of the springs of the vehicle plus that which corresponds with the effort of starting. The presence of the two buffers, each resembling the other, permits the vehicle to be driven in either direction.

It is obvious that instead of employing three pairs of buffers in each wheel any convenient number whatever may be employed; also, the springs *r* may have any suitable form other than that shown by the drawings.

Figure 3:
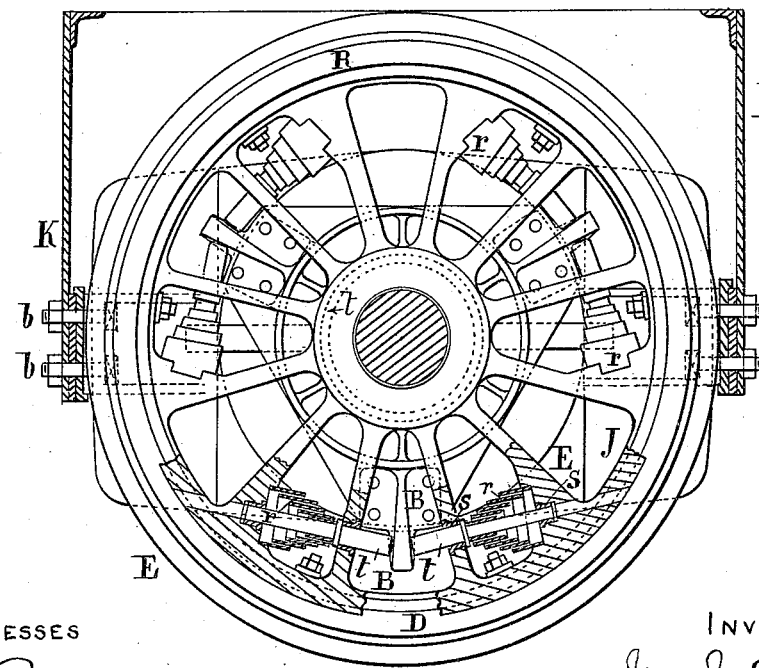

Figs. 2 and 3 show at *b* the bolts by means of which the motor field-magnets J are fixed to the framing K of the vehicle.

Having now particularly described my invention, what I claim is—

1. In an electro-locomotive, the combination with the axle and driving wheels, of a frame spring-supported on said axle, a motor mounted on said frame, having a hollow armature shaft encircling the axle and of an internal diameter sufficient to permit relative displacement of the axle and shaft, pairs of oppositely disposed spring buffers carried by one of said wheels within the planes of the faces of said wheel, and radial arms secured to one end of the armature shaft, each entering loosely between two buffers composing a pair, substantially as described.

2. In an electric locomotive, the combination with one of the driving wheels, of pairs of oppositely arranged pins, each pin passing through a spoke, a spring connected with each pin and acting to force it toward its mate, a hollow armature shaft inclosing the axle, and of an internal diameter sufficient to permit relative displacement of the axle and the shaft, and arms secured to said shaft, each arm entering between two opposing pins, substantially as described.

3. In an electric locomotive, the combination with one of the driving wheels, of pairs of oppositely arranged pins, each pin passing freely through two spokes, a helical spring surrounding each pin between said spokes and acting to force the pins toward each other, a hollow armature shaft inclosing the axle, and of an internal diameter sufficient to permit relative displacement of the axle and the shaft, and arms secured to said shaft, each arm entering between two opposing pins, substantially as described.

In testimony whereof I affix my signature in presence of two witnesses.

Paris, December 22, 1894.

JEAN JACQUES HEILMANN.

Witnesses:
 HENRY DANZER,
 CLYDE SHROPSHIRE.